May 24, 1966  H. E. BRENT  3,252,644
APPARATUS FOR SECURING CONDUCTORS AND CONTACTORS
Filed Dec. 17, 1964  5 Sheets-Sheet 1

INVENTOR.
H.E. BRENT
BY
ATTORNEY

May 24, 1966  H. E. BRENT  3,252,644
APPARATUS FOR SECURING CONDUCTORS AND CONTACTORS
Filed Dec. 17, 1964  5 Sheets-Sheet 2

FIG. 4

May 24, 1966  H. E. BRENT  3,252,644
APPARATUS FOR SECURING CONDUCTORS AND CONTACTORS
Filed Dec. 17, 1964   5 Sheets-Sheet 3

May 24, 1966  H. E. BRENT  3,252,644
APPARATUS FOR SECURING CONDUCTORS AND CONTACTORS
Filed Dec. 17, 1964  5 Sheets-Sheet 4

United States Patent Office 3,252,644
Patented May 24, 1966

3,252,644
APPARATUS FOR SECURING CONDUCTORS AND CONTACTORS
Herbert E. Brent, Baltimore, Md., assignor to Western Electric Company Incorporated, New York, N.Y., a corporation of New York
Filed Dec. 17, 1964, Ser. No. 419,132
9 Claims. (Cl. 228—13)

This invention relates to apparatus for securing conductors to contactors and particularly relates to securing a plurality of conductors with commonly supported contactors.

As disclosed in an application for U.S. Letters Patent, Serial Number 418,995, filed on December 17, 1964, in the name of V. A. Rayburn, a plurality of spacially arranged, commonly supported, miniature contactors are formed with pockets for receiving stripped ends of conductors which are to be secured therewith. The contactors are spacially supported to facilitate subsequent insertion of the contactors into cells of coupler units as disclosed in the above-mentioned V. A. Rayburn patent application. Conventional securing techniques for securing the conductors within the pockets of the contactors include the positioning of the conductors within the contactor pockets, moving a heated solder bar into engagement with the ends of cold solder strands so that the solder melts and spreads out adheringly on the bar, and thereafter moving the solder bar to deposit the molten solder within the pockets where, upon cooling of the solder, the conductors are secured with the contactors. However, by utilizing such conventional securing techniques, serious problems have been encountered due to the miniature size of the contactors and, further, due to the minimum spacing between the commonly supported contactors necessary for subsequent handling of the contactors as described in the above-mentioned patent application filed in the name of V. A. Rayburn.

The problems encountered by utilizing the conventional techniques include the overflow of the readily flowable molten solder from within the contactor pockets where, upon cooling of the solder, the solder on the outer portions of the pocket increases the critical dimensions of the pocket and precludes insertion into the cells of the coupler. Further, the overflow of the molten solder bridges adjacent contactors which are critically spaced to facilitate subsequent handling of the commonly supported contactors.

It is an object, therefore, of this invention to provide new and improved apparatus for securing conductors with contactors.

Another object of the invention is the provision of apparatus for simultaneously securing a plurality of conductors within miniature pockets of spaced, commonly supported contactors.

Still another object of the invention is the provision of apparatus for soldering conductors within contactor pockets while precluding the formation of solder deposits on the outer surfaces of the pockets and bridging adjacent contactor pockets.

With these and other objects in view, the present invention contemplates apparatus for securing a plurality of conductors within pockets of a corresponding plurality of commonly supported, spaced, miniature contactors which includes positioning ends of the conductors within corresponding pockets of the supported contactors, heating the pockets and thereafter depositing solder into the heated pockets, whereby the solder melts and is confined to the pocket enclosure and is precluded from overflowing from the pocket. Upon cooling of the solder, the conductors are secured with the contactors.

In a preferred embodiment of the invention, the commonly supported plurality of contactors are positioned in a holder in a desired orientation and the conductor ends are held in a movable nest spacially adjacent the supported contactors. Thereafter, the nest is moved to position the conductors within the contactor pockets and the assembly is moved toward a heating device which engages the underside of the pockets to heat the pockets. Subsequently, the leading ends of individual strands of solder are inserted into the opening of the heated pockets. The strands of solder are allowed to dwell for a sufficient period to deposit sufficient molten solder in each pocket to secure the conductors within the pockets upon cooling of the solder. However, the deposited solder is of insufficient volume to overflow the pocket, thereby precluding bridging of adjacent contactors and the undesirable formation of solder deposits on the outer surface of the pockets.

Other objects and advantages of the invention will become apparent by reference to the following detailed description and the accompanying drawings illustrating a preferred embodiment thereof, in which.

Figure 3:
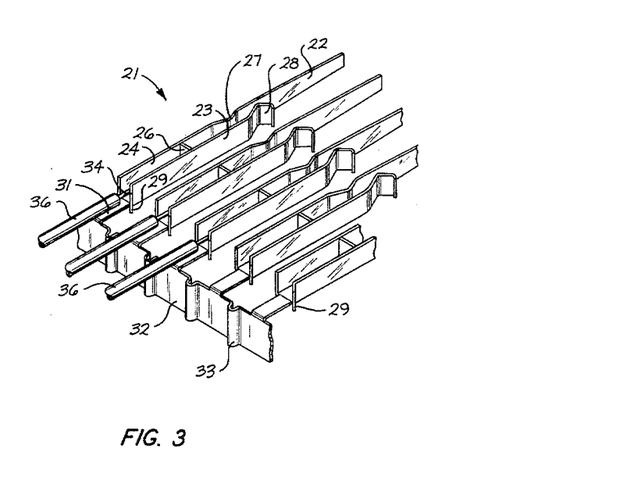
FIG. 3 is a partial perspective view showing commonly supported contactors with exposed ends of conductors assembled therewith.

Referring to FIG. 3, a plurality of contactors, generally designated by the reference numeral 21, includes a long tine 22 and a short tine 23 extending in a parallel, spaced relation from a contactor, conductor-receiving pocket 24. A tab 26 extends transversely between the spaced tines 22 and 23 to define the conductor-receiving pocket 24. In addition, the long tine 22 is formed with an intermediate ramp 27 and the short tine 23 is formed with a hook ramp 28 at the free end thereof and is further formed with an outwardly turned tab 29 at the pocket end thereof.

To facilitate handling of the contactors 21 in a gang assembly during the operation of securing conductor ends with the pockets 24 of the contactors 21, each contactor is formed with a rib strip 31 which extends from the rearward portion of the pocket 24 and is contiguous with a common backbone strip 32. As shown in FIG. 3, the backbone strip 32 is common to each of the contactors 21 and supports the contactors in a spaced, parallel relation through the interconnecting rib strips 31. The backbone strip 32 is formed with crimps 33 to facilitate closer spacing between adjacent commonly supported contactors 21 where such spacing is necessary for the insertion of the contactors into contactor-receiving cells of coupler units in accordance with the previously mentioned patent application of V. A. Rayburn.

The backbone-supported contactors 21 are positioned in a desired orientation for receiving exposed ends 34 of conductors 36 within each respective contactor pocket 24. Thereafter, the underside of the contactor pockets 24 are commonly heated and cold solder is deposited into each pocket. The heat emanating from the heated pockets 24 melts the solder where, upon cooling, the conductor ends 34 are secured within the contactor pockets 24. Thereafter, the backbone strip 32 is severed along the spaced crimps 33 to provide a plurality of conductor-supporting contactors 21 held in a common relation by a segment of the backbone strip 32.

GENERAL DESCRIPTION

Figure 1:
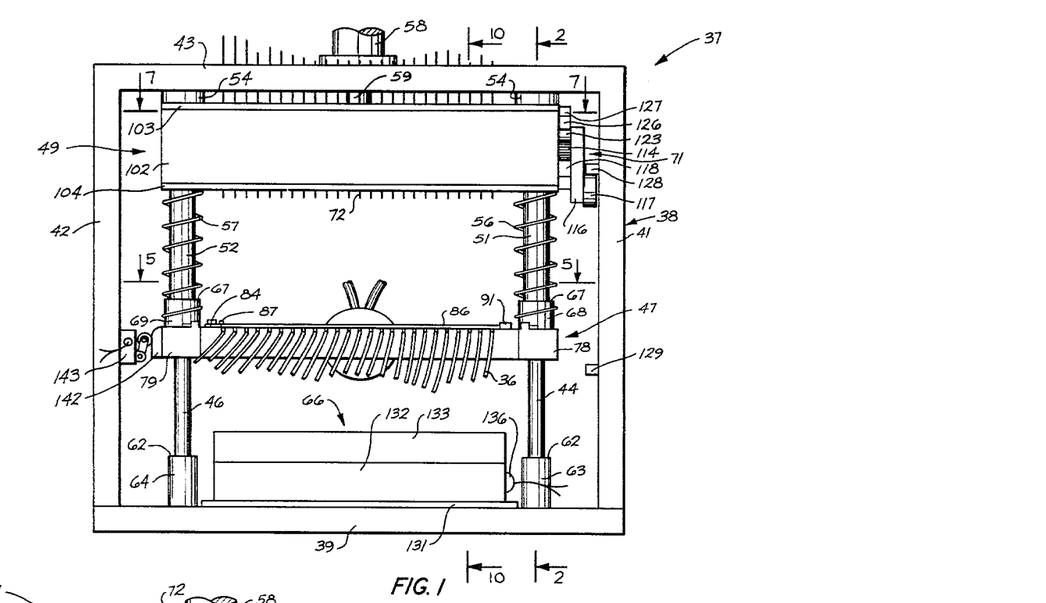
FIG. 1 is a front view showing an apparatus for securing conductors with contactors in accordance with the objects of the invention.
Figure 2:
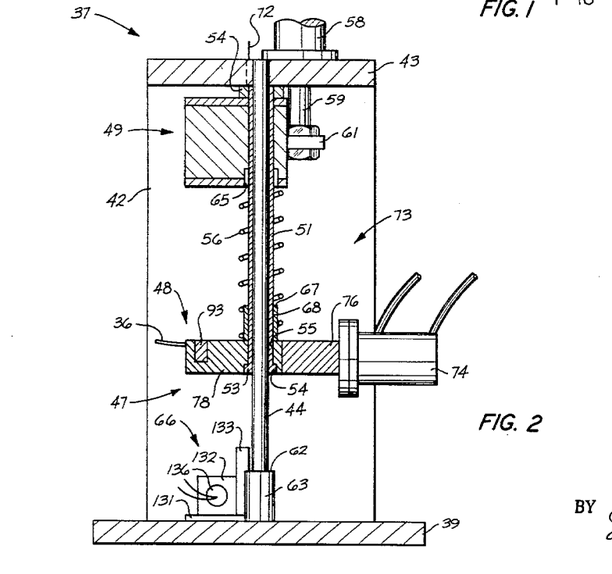
FIG. 2 is a sectional view taken along line 2—2 of FIG. 1 showing the securing apparatus.
Figure 4:
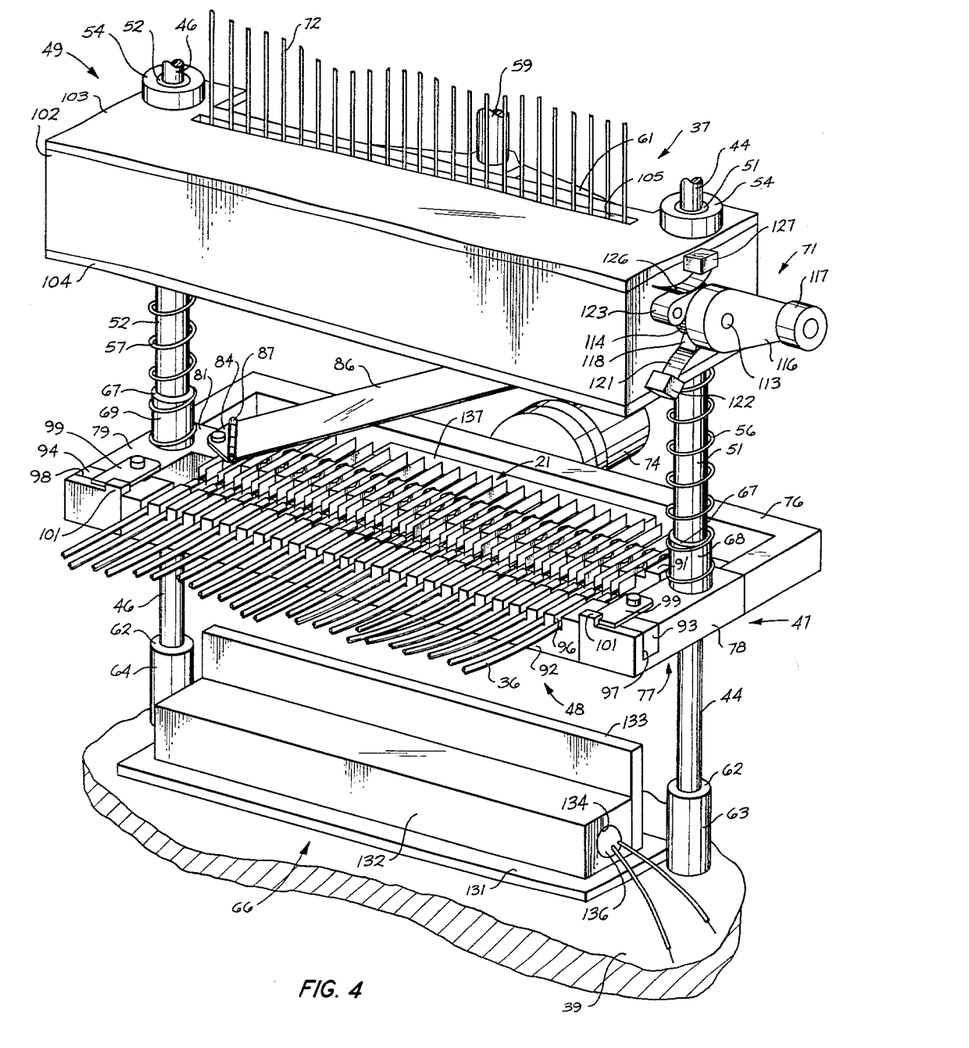
FIG. 4 is a perspective view showing the conductors assembled with the contactors supported by the securing apparatus.

Referring to FIGS. 1, 2 and 4, a securing apparatus, designated generally by the reference numeral 37, includes an inverted U-shaped support 38 positioned on a horizontal base 39. The support 38 is provided with side members 41 and 42 and an upper cross member 43.

A pair of spaced rods 44 and 46 extend and are supported between the base 39 and the cross member 43 of the support 38. The rods 44 and 46 provide a guiding support for the slideable movement of a carriage, generally designated by the reference numeral 47, which extends between the rods and is formed with structure for supporting the backbone-supported contactors 21. In addition, the carriage 47 is provided with structure for supporting a conductor-supporting fixture, generally designated by the reference numeral 48, which is assembled with the carriage in such a manner that the exposed conductor ends 34, which extend from the fixture, rest in the pockets 24 of the contactors 21. A solder feed mechanism, generally designated by the reference numeral 49, is also slideably supported on and extends between the rods 44 and 46 and is spacially positioned above the carriage 47.

A pair of sleeves 51 and 52 are slideably positioned about the rods 44 and 46, respectively, and extend through the carriage 47 at one end thereof and through the solder feed mechanism 49 at the opposite end thereof. The lower ends of the sleeves 51 and 52 are each formed with a flange 53 which fits into complementary countersinks 54 contiguous with a pair of spaced apertures 55 (only one shown) formed in the underside of the carriage 47. In addition, each of the sleeves 51 and 52 is provided with a collar 54 which is secured at the opposite ends thereof adjacent the upper surface of the solder feed mechanism 49. A pair of compression springs 56 and 57 are positioned about the sleeves 51 and 52, respectively, and extend between the carriage 47 and the solder feed mechanism 49 to normally urge apart the carriage and the feed mechanism.

An air cylinder 58 is supported atop the cross member 43 of the support 38 and has a piston rod 59 which extends through the cross member. The free end of the piston rod 59 is secured to a web 61 which extends horizontally from the solder feed mechanism 49. When the air cylinder 58 is in the retracted position, the solder feed mechanism 49 is supported in an upper, nonfeeding position, as shown in FIGS. 1 and 2, wherein the collars 54, which are fastened to the upper ends of the sleeves 51 and 52, are held against the underside of the cross member 43. Since the sleeves 51 and 52 are provided with lower end flanges 53 which are positioned within the complementary countersinks 54 of the carriage 47, the carriage is held in a spaced relation with respect to the solder feed mechanism 49.

As the air cylinder 58 is actuated, the solder feed mechanism 49 is lowered. Due to the biasing action of the compression springs 56 and 57, the carriage 47 is retained in the spaced relation with respect to the solder feed mechanism and is also lowered, whereby the sleeves 51 and 52 slide guidedly over the rods 44 and 46. Subsequently, the carriage 47 engages the upper shoulders 62 of a pair of spacers 63 and 64 which are positioned about the lower ends of the rods 44 and 46, respectively. The engagement of the carriage 47 with the spacers 63 and 64 precludes continued downward movement of the carriage. As the carriage 47 reaches this lowermost point of travel, a heating device, generally designated by the reference numeral 66, engages the undersides of the commonly supported contactor pockets 24, whereby the pockets, which are assembled with exposed conductor ends 34, are heated.

Continued operation of the air cylinder 58 moves the solder feed mechanism 49 in a continued downward direction, against the biasing action of the compression springs 56 and 57. Subsequently, countersinks 65, formed in the underside of the feed mechanism 49, as viewed in FIG. 2, engage upper shoulders 67 of a pair of spacers 68 and 69 which are positioned about the sleeves 51 and 52, respectively, atop the carriage 47.

A solder advancing mechanism, generally designated by the reference numeral 71, advances the leading ends of individual strands 72 of cold solder which extend from a solder supply (not shown), through the solder feed mechanism 49 and from the underside of the solder feed mechanism. As the solder feed mechanism 49 engages the spacers 68 and 69, the leading ends of the individual strands 72 of the cold solder are deposited into the respective heated contactor pockets 24, whereupon the solder melts and flows about the conductor ends 34 assembled within the respective contactor pockets. As the air cylinder 58 is withdrawn to a retracted position, the solder feed mechanism 49 and the carriage 47 are withdrawn to the upper position whereby the biasing action of the compression springs 56 and 57 urge apart the feed mechanism and the carriage. As the carriage 47 is moved away from the heating device 66, the contactor pockets 24 are cooled and the molten solder solidifies to secure the assembled conductor ends 34 with the respective contactors 21.

A cutting mechanism, generally designated by the reference numeral 73, includes an air cylinder 74 which is supported on a horizontally disposed C-shaped frame 76 which extends from and is supported by the carriage 47. Subsequent to the securing operation, the cutting mechanism 73 is operated to sever the backbone strip 32 along selected crimps 33, thereby providing a plurality of backbone-supported contactor segments with individual conductors 36 secured with the respective contactors 21 of the segments.

CARRIAGE 47 AND FIXTURE 48

Referring to FIGS. 1, 2, 4 and 5, the carriage 47 includes a C-shaped support 77 having side members 78 and 79 with an interconnecting cross member 81. The support 77 is formed with the pair of spaced apertures 55 (FIG. 2) at the intersections of the side members 78 and 79 with the cross member 81 and facilitate the reception of the sleeves 51 and 52 therein. In addition, it is noted that the countersinks 54 are formed in the underside of the apertures 82 to facilitate reception of the complementary formed flange 53 of the sleeves 51 and 52. The cross member 81 of the support 77 is formed transversely with a plurality of spaced, parallel notches 83 for receiving the backbone-supported contactors 21. A base 84 is pivotally mounted to the slotted surface of the cross member 81 in alignment with the slots 83 and supports an overhead clamp 86 through a spring-biased hinge 87 which normally urges the clamp in an upward position, as shown in FIG. 4.

Initially, the overhead clamp 86 is pivoted away from a position over the slots 83 and an operator positions the backbone-supported contactors 21 into the properly spaced slots 83 of the cross member 81, whereby the hooked ramps 28 of the short tines 23 engage the outer surface of the member 81 adjacent the respective slots 83. In addition, the contactor pockets 24 project from the opposite ends of the respective slots 83 with the backbone strip 32 in parallel, spaced alignment with the cross member 81. It is particularly noted that the spacing between adjacent slots 83 conforms with the spacing between adjacent contactors 21 commonly held by the crimped backbone strip 32.

Subsequent to the positioning of the contactors 21 within the slots 83, the overhead clamp 86 is pivoted to a position over the assembled contactors 21 and is urged downwardly. The free end of the clamp 86 is formed with a projection 88 which is inserted into a complementary slot 89 of a locking projection 91 which is formed on the cross member 81. In this manner, the overhead clamp 86 is locked in a position above the contactors 21, thereby retaining the contactors within the slots 83 during subsequent assembly and securing operations. It is noted that the slotted portion of the carriage 47 absorbs some of the heat from the contactor pockets 24, thereby reducing the undesirable application of heat to the contactor tines 22 and 23.

Figure 5:
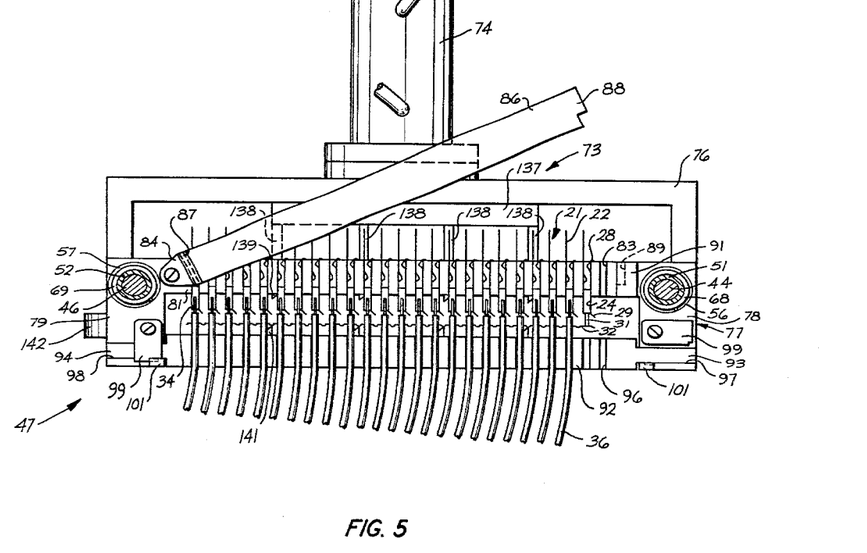
FIG. 5 is a partial sectional view taken along line 5—5 of FIG. 1 showing a plan view of the conductor-contactor assembly supported by the securing apparatus.
Figure 6:
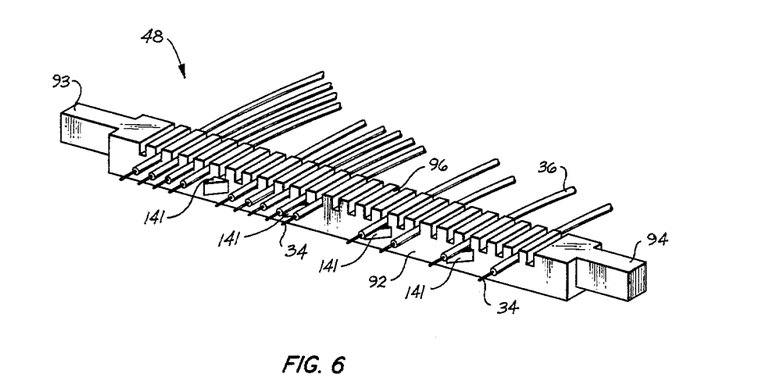
FIG. 6 is a perspective view of a fixture for supporting the conductors in an assembled relation having structure for facilitating assembly of the fixture with the securing apparatus.

As shown in FIG. 6, the conductor-supporting fixture 48 includes a bar 92 having reduced projections 93 and 94 extending from opposite ends thereof and transverse slots 96 formed along one surface thereof for receiving conductors 36. The operator asembles the conductors 36 within the slots in a desired pattern as disclosed in the previously mentioned application of V. A. Rayburn. The conductors 36 are assembled within the slots in such a manner that the exposed conductor ends 34 extend from a common side of the fixture 48 in parallel alignment. Subsequent to the assembly of the conductors 36 within the fixture slots 96, the operator positions the fixture projections 93 and 94 into complementary, aligned slots 97 and 98, respectively, transversely formed in the carriage side member 78 and 79, respectively, as viewed in FIGS. 4 and 5. It is noted that the spacing between the slots 96 coincide with the spacing in the carriage slots 83 and, hence, are aligned with the assembled, clamped contactors 21.

As the operator positions the conductor-supporting fixture 48 within the carriage slots 97 and 98, the individual aligned conductor ends 34 are inserted into the contactor pockets 24. Thereafter, a pair of pivotal clamps 99, which are mounted on the support side members 78 and 79 adjacent the slots 97 and 98, are pivoted atop the fixture projections 93 and 94 into engagement with slots formed in respective locking projections 101 to preclude undesirable movement of the fixure 48 relative to the carriage 47.

SOLDER FEED MECHANISM 49 AND ADVANCING MECHANISM 71

Figure 7:
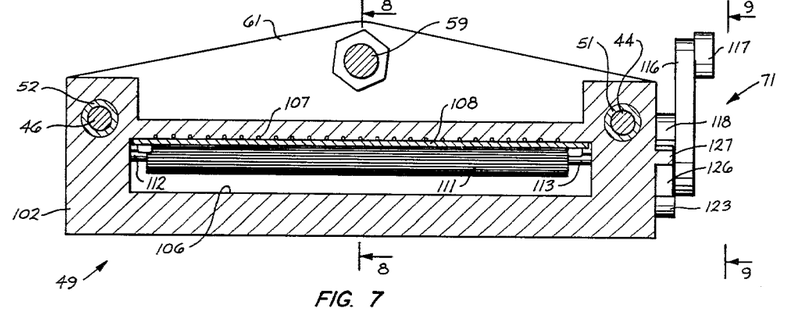
FIG. 7 is a sectional view taken along line 7—7 of FIG. 1 showing a solder feed mechanism for feeding strands of solder into the area whereat the conductors and contactors are assembled.
Figure 8:
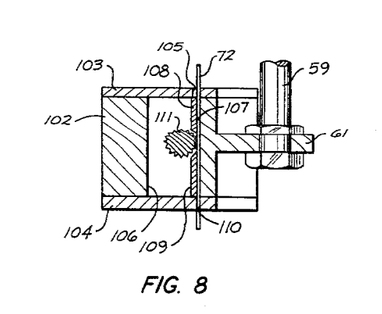
FIG. 8 is a sectional view taken along line 8—8 of FIG. 7 showing a strand of solder passing through the soldering mechanism.

Referring to FIGS. 4, 7 and 8, the solder feed mechanism 49 includes a housing 102 enclosed by a top plate 103 and a bottom plate 104. The housing 102 is formed with a central opening 106 and is further formed with spaced, parallel grooves 107 along one wall of the opening 106 for facilitating passage of the solder strands 72 therethrough.

As viewed in FIGS. 4 and 8, the plate 103 is formed with a slot 105 for facilitating the entrance of the solder strands 72 into the housing 102. In addition, the plate 104, viewed in FIG. 8, is formed with apertures 110 (one shown) for facilitating the exiting of the solder strands 72 from the housing 102. A pair of spaced plates 108 and 109 are secured to the grooved wall of the central opening 106, thereby enclosing the grooves 107. In this manner, each of the strands 72 of solder pass through an enclosed slot.

Referring to FIG. 8, the closure plates 108 and 109 are spaced apart to provide an opening therebetween which exposes the solder strands 72 within the housing grooves 107. A feed roller 111 is mounted for rotation in the housing 102 and is positioned partially into the opening 106 in such a manner that a splined surface of the feed roller engages the solder strands 72 in the exposed opening between the closure plates 108 and 109. Hence, as the roller 111 is rotated, the splined surface engages the solder strands 72 and moves downwardly the strands through the housing slots 107 to a position as viewed in FIG. 8. As shown in FIG. 7, the splined roller 111 is provided with a reduced shank 112 at one end thereof which is mounted in the housing 102 to facilitate the rotation of the roller. The opposite end of the roller 111 is formed with another shank 113 which extends through the housing, as viewed in FIG. 9.

Figure 9:
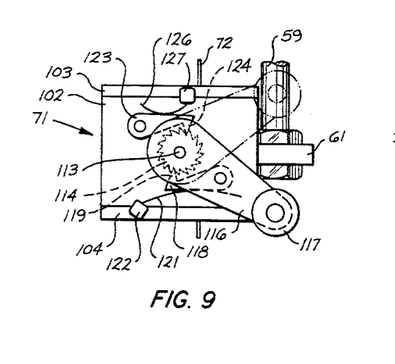
FIG. 9 is a view taken along line 9—9 of FIG. 7 showing a ratchet and pawl mechanism for advancing a feed wheel for the solder mechanism.

As viewed in FIG. 9, the solder-advancing mechanism 71 includes a serrated ratchet wheel 114 which is keyed to the roller shank 113 for driving rotation therewith. In addition, an actuator arm 116 having an actuator roller 117 mounted at the free end thereof is positioned on the roller shank 113 for free rotation relative thereto. A pawl 118 is pivotally secured to an intermediate portion of the actuator arm 116 and is formed with a wedge 119 at the free end thereof for engaging the serrations of the ratchet wheel 114. A leaf spring 121 extends from a mounting 122 secured to the housing 102 and engages and urges the pawl 118 into engagement with the ratchet wheel 114. A second pawl 123 is pivotally mounted on the housing 102 and is formed with a wedge 124 on the free end thereof. The pawl 123 is urged into engagement with the serrations of the ratchet wheel 114 by a leaf spring 126 extending from a mounting 127 secured to the housing 102.

Referring to FIGS. 1 and 9, as the solder feed mechanism 49 is moved upwardly as previously discussed, the actuator arm 116 is in an upward position, as shown in phantom view in FIG. 9. Subsequently, the actuating roller 117 engages a projection 128 secured to the inner wall of the support side member 41 where, upon continued upward movement of the feed mechanism 49, the actuator arm 116 is pivoted downwardly to a position shown in a solid view in FIG. 9. As the actuator arm 116 is pivoted downwardly, the wedge 119 of the pawl 118 rotates the ratchet wheel 114. Since the ratchet wheel 114 is keyed to the shank 113 of the feed roller 111, the feed roller will also rotate, whereby the splined surface of the roller bites into the solder strands 72 to advance the strands to a position as shown in FIGS. 1 and 8 in preparation for a subsequent soldering operation.

As the solder feed mechanism 49 is lowered for a soldering operation as previously discussed, the actuating roller 117 subsequently engages a projection 129 extending from the inner wall of the support side member 41, whereby the actuator arm 116 is pivoted from the lower position to the upper position, as viewed in FIG. 9. As the actuator arm 116 is pivoted upwardly upon engagement of the projection 129 by the roller 117, the wedge 119 of the pawl 118 rides out of and passes over the successive serrations of the ratchet wheel 14. However, the wedge 124 of the pawl 123 retains the ratchet wheel 114 in the previously selected position, thereby precluding the possibility of slippage of the wheel and further, undesirable movement of the feed roller 111 and the solder strands 72.

HEAT DEVICE 66 AND CUTTING MECHANISM 73

Referring to FIGS. 1, 2 and 4, the heating device 66 includes a platform 131 which is positioned atop the base 39 for supporting a heat transfer member 132 and a heat bar 133. The heat transfer member 132 is provided with an opening 134 for receiving an electrically controlled heat capsule 136. The heat capsule 136 supplies the necessary heat which is transmitted to the heat bar 133 through the capsule-supporting, heat transfer member 132. As the carriage 47 is lowered, the undersides of the contactor pockets 24 rest upon the upper surface of the heat bar 133 and are heated thereby.

Figure 10:
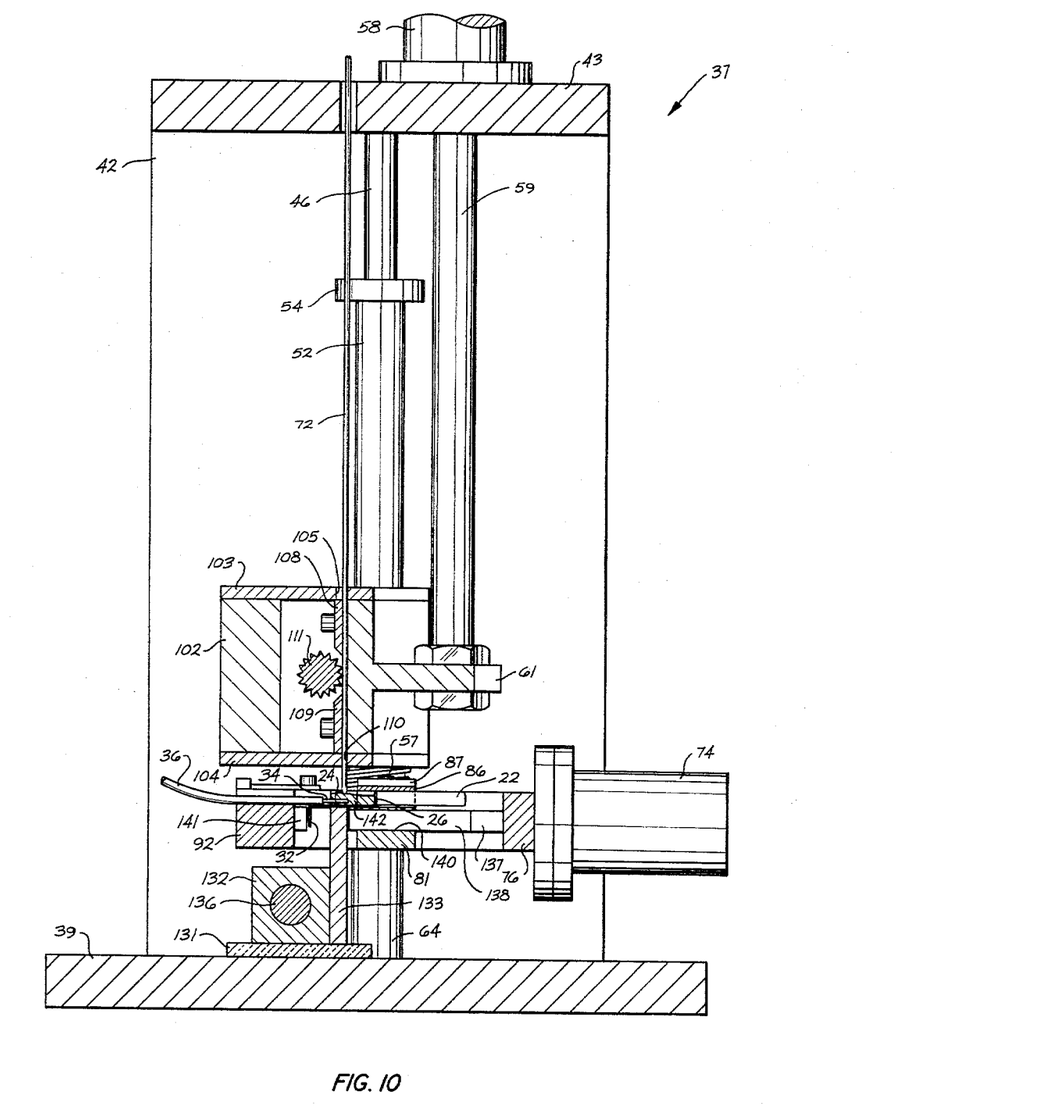
FIG. 10 is a sectional view taken along line 10—10 of FIG. 1 showing the solder feed mechanism advanced to a feeding position wherein solder is deposited upon an assembly including an exposed conductor end and a heated conductor-receiving pocket of the contactor.

Referring to FIG. 5, the cutting mechanism 73 includes the air cylinder 74 which is secured to the frame 76 and is provided with a piston rod (not shown) secured at the free end thereof to a cutter blade cross support 137. A plurality of cutting fingers 138 extend from and are supported by the cross support 137. In addition, as shown in FIG. 10, the fingers 138 extend through passageways 140 (one shown) formed in the support cross member 81 and are provided with wedge-shaped ends 139 at the free ends thereof to facilitate the cutting operation.

Referring to FIGS. 5 and 6, the bar 92 of the conductor-supporting fixture 48 is formed with wedge-shaped cutting elements 141. As the fixture 48 is assembled with the carriage 47, the cutting elements 141 are aligned with the wedge-shaped ends 139 of the cutting fingers 138 with the backbone strip 32 positioned therebetween. By aligning the cutting elements 141 with the wedge-shaped ends 139 of the cutting fingers 138, shear planes are defined between respective pairs of the opposed cutting elements and fingers.

Subsequent to the securing operation wherein the conductor ends 34 are secured within the contactor pockets 24 and further, as the carriage 47 is moved to the upper position, an actuator projection 142 extending from the carriage actuates a switch 143 which is fixedly attached to the side member 42. As the switch 143 is actuated, a timer (not shown) operates the air cylinder 74, whereby the cutting fingers 138 slide through the passageways 140 of the support cross member 81 and cooperate with the respective cutting elements 141 of the fixture 48 to sever the backbone strip 32 at selected intervals, thereby providing a plurality of contactor-supporting segments with each segment commonly supporting a plurality of contactors 21 having conductors 36 secured thereto.

OPERATION

Initially, the securing apparatus 37 is conditioned for a securing operation wherein the solder feed mechanism 49 and the carriage 47 are maintained in the upper position, as shown in FIGS. 1, 2 and 4. In addition, the solder strands 72, which extend from the solder supply, are passed through the housing 102 and protrude from the underside of the feed mechanism 49 with predetermined, spaced lengths of solder, as shown in FIGS. 1 and 8. An operator positions the backbone supported contactors 21 into the spaced slots 83 of the carriage 47 and the overhead clamp 86 is locked in a position atop the assembled contactors to retain the contactors with the carriage. Thereafter, the operator assembles conductors 36 within the slots 96 of the conductor-supporting fixture 48 in a desired pattern. The fixture 48 is then assembled with the carriage 47, whereby the exposed conductor ends 34 are inserted into the pockets 24 of the commonly supported contactors 21.

A time control mechanism (not shown) initiates the securing and severing operations wherein the air cylinder 58 is operated to lower the solder feed mechanism 49 and carriage 47. As the carriage 47 is moved downwardly, the sleeves 51 and 52 slide over the rods 44 and 46, respectively, thereby moving the carriage, the feed mechanism 49 and the sleeves as a complete assembly. Due to the biasing action of the compression springs 56 and 57, spacial relation between the feed mechanism 49 and the carriage 47 is maintained until the carriage engages the shoulders 62 of the spacers 63 and 64. As the carriage 47 engages the spacers 63 and 64, the underside of the contactor pockets 24 engage the heat bar 133 and are heated thereby, as viewed in FIG. 10.

As further viewed in FIG. 10, continued operation of the air cylinder 58 moves the solder feed mechanism 49 downwardly against the biasing action of the compression springs 56 and 57. Subsequently, the countersinks 65 of the solder feed mechanism 49 engage the spacers 68 and 69, whereby the continued downward movement of the feed mechanism is precluded. As the solder feed mechanism 49 approaches the spacers 68 and 69, the leading ends of the solder strands 72 projecting from the underside of the feed mechanism are inserted into the heated contactor pockets 24, whereby the heat emanating from the pockets melts the leading ends of the solder strands and the molten solder flows within the contactor pocket about the assembled conductor end 34.

The cross-section dimension of the solder strand 72 is less than the critical dimensions of the contactor pocket 24. Hence, insertion of the cold solder strands 72 directly into the heated contactor pockets 24 precludes the overflow of solder from the pockets. Prior procedures utilized for securing conductors within contactor pockets includes initially melting the cold solder onto a solder applicator, such as a solder bar, and thereafter depositing the molten solder from the applicator into the contactor pockets. However, where the pocket dimensions are critically small, such as the dimensions of the contactor pockets 24, and further, in view of the flowable nature of molten solder relative to the solder in its cold state, it is difficult to contain the molten solder within the critical dimensions of the pocket during the depositing of the solder into contactor pockets. When such procedures are used, the molten solder tends to spread on the solder applicator to a dimension greater than the dimensions of the contactor pockets 24 and, therefore, the molten solder is deposited partially outside of the pockets.

Since the contactors 21 are subsequently inserted into critically dimensioned, contactor-receiving cells of coupler units, the presence of solidified solder on the outer surfaces of the contactor pockets 24 is an undesirable feature. In addition, the procedure of depositing molten solder directly into the contactor pockets 24 frequently results in the bridging of the solder between adjacent contactors 21, again producing an undesirable feature. Hence, by using the procedure of the present invention, the cold solder strands 72, which have smaller dimensions relative to the size of the contactor pockets 24, are inserted directly into the pockets and are thereafter melted to insure the accurate deposition of molten solder within the pockets for the securing operation.

As the solder feed mechanism 49 is lowered, the roller 117 engages the projection 129 (FIG. 1), whereby the arm 116 is pivoted upwardly to the phantom view position of FIG. 9. After a predetermined dwell period, the air cylinder 58 is retracted to move upwardly the solder feed mechanism 49. However, the biasing action of the compression springs 56 and 57 maintain the carriage 47 in the lowermost position as viewed in FIG. 10. Subsequently, the upper surface of the solder feed mechanism 49 engages the collar 54 where, upon continued retracting operation of the air cylinder 58, the solder feed mechanism, the carriage 47 and the sleeves 51 and 52 are moved upwardly as a single assembly. As the carriage 47 is moved upwardly and away from the heat bar 133, the contactor pockets 24, and hence, the deposited solder 142, cools and the deposited solder solidifies, thereby securing the conductor ends 34 within the respective contactor pockets.

As the carriage 47 reaches the upper position, as viewed in FIGS. 1, 2 and 4, the switch 143 is actuated to operate the cutting timer (not shown) and the air cylinder 74 is operated to slide the cutting fingers 138 through the cross member 81 and into cooperative relation with the cutting elements 141 of the fixture 48, thereby shearing the backbone strip 32 at selected intervals. Upon continued operation of the timer, the air cylinder 74 is retracted and the operator releases the overhead clamp 86 and pivots the clamp into a position away from the contactors 21. Thereafter, the operator removes the individual segments of backbone supported contactors 21 from the carriage 47 and also removes the respective conductors 36 from the fixture 48.

It is to be understood that the above-described arrangements are illustrative of the principles of the invention. A number of other arrangements may be devised by those skilled in the art without departing from the spirit and scope of the invention.

What is claimed is:

1. Apparatus for soldering a plurality of conductors with a corresponding plurality of spaced contactors integrally held by a backbone strip, which comprises:
 a frame,
 an assembly slideably mounted on the frame, which includes:
  means for supporting the plurality of integrally held, spaced contactors,
  means secured to contactor-supporting means for supporting the corresponding plurality of conductors in an assembled relation with the contactors,
  means for holding the leading ends of strands of solder in an aligned orientation adjacent and spaced from the contactor-supporting means, and
  biasing means for normally maintaining the contactor-supporting means and the solder-holding means in the spaced relation,
 means spaced from the contactors for heating the contactors, and
 means for moving the assembly toward the heating means with the supported contactors being heated thereby and for moving the solder-holding against the action of the biasing means toward the contactor-supporting means with the solder ends being deposited onto the heated, assembled contactors and conductors so that the solder melts and where, upon cooling, the conductors are secured with the respective contactors.

2. Apparatus for soldering a plurality of conductors with a corresponding plurality of spaced contactors integrally held by a backbone strip, which comprises:
 a frame,
 an assembly slideably mounted on the frame, which includes:
  means for supporting the plurality of integrally held, spaced contactors,
  means secured to contactor-supporting means for supporting the corresponding plurality of conductors in an assembled relation with the contactors,
  means for holding the leading ends of strands of solder in an aligned orientation adjacent and spaced from the contactor-supporting means, and
  biasing means for normally maintaining the contactor-supporting means and the solder-holding means in the spaced relation,
 means spaced from the contactors for heating the contactors,
 means for moving the assembly toward the heating means with the supported contactors being heated thereby and for moving the solder-holding means against the action of the biasing means toward the contactor-supporting means with the solder ends being deposited onto the heated, assembled contactors and conductors so that the solder melts and where, upon cooling, the conductors are secured with the respective contactors,
 means for moving the assembly away from the heating means subsequent to the soldering operation, and
 means responsive to the movement of the assembly away from the heating means for cutting the backbone strip at selected intervals thereby providing a plurality of backbone segments which support integrally contactors having conductors secured therewith.

3. Apparatus for soldering a plurality of conductors with a corresponding plurality of integrally held contactors, which comprises:
 a frame,
 an assembly slideably mounted on the frame, which includes:
  a carriage formed with slots for supporting the plurality of integrally held, spaced contactors,
  a fixture secured to the carriage and having nests for supporting the corresponding plurality of conductors in an assembled relation with the contactors,
  means for holding the leading ends of strands of solder in an aligned orientation adjacent and spaced from the carriage, and
  biasing means for normally maintaining the carriage and the solder-holding means in the spaced relation,
 means spaced from the contactors for heating the contactors, and
 means for moving the assembly toward the heating means with the carriage-supported contactors being heated thereby and for moving the solder-holding means against the action of the biasing means toward the carriage with the solder ends being deposited onto the heated, assembled contactors and conductors so that the solder melts and where, upon cooling, the conductors are secured with the respective contactors.

4. Apparatus for soldering a plurality of conductors with a corresponding plurality of integrally held contactors, which comprises:
 a frame,
 an assembly slideably mounted on the frame, which includes:
  means for supporting the plurality of integrally held, spaced contactors,
  means secured to contactor-supporting means for supporting the corresponding plurality of conductors in an assembled relation with the contactors,
  a housing,
  parallel, spaced slots extending through the housing for receiving and guiding solder strands therethrough,
  means within the housing in engagement with the intermediate portions of the solder strands for holding the strands in a commonly aligned position adjacent and spaced from the contactor-supporting means, and
  biasing means for normally maintaining the contactor-supporting means and the housing in a spaced relation,
 means spaced from the contactors for heating the contactors, and
 means for moving the assembly toward the heating means with the supported contactors being heated thereby and for moving the housing against the action of the biasing means toward the contactor-supporting means with the aligned, solder ends being deposited onto the heated, assembly contactors and conductors so that the deposited solder melts and where, upon cooling, the conductors are secured with the respective contactors.

5. Apparatus for soldering a plurality of conductors with a corresponding plurality of integrally held contactors, which comprises:
 a frame, an assembly slideably mounted on the frame, which includes:
    means for supporting the plurality of integrally held, spaced contactors,
    means secured to contactor-supporting means for supporting the corresponding plurality of conductors in an assembled relation with the contactors,
    a housing,
    parallel, spaced slots extending through the housing for receiving and guiding solder strands therethrough,
    means within the housing in engagement with the intermediate portions of the solder strands for holding the strands in a commonly aligned position adjacent and spaced from the contactor-supporting means, and
    biasing means for normally maintaining the contactor-suuporting means and the housing in a spaced relation,
means spaced from the contactors for heating the contactors,
means for moving the assembly toward the heating means with the supported contactors being heated thereby and for moving the housing against the action of the biasing means toward the contactor-supporting means with the aligned, solder ends being deposited onto the heated, assembled contactors so that the deposited solder melts and where, upon cooling, the conductors are secured with the respective contactors,
means for moving the assembly away from the heating units subsequent to the soldering operation, and
means responsive to the movement of the assembly away from the heating means for advancing the solder strands through the housing slot to the commonly aligned positioned thereby replenishing the solder expended in the previous soldering operation.

6. Apparatus for soldering a plurality of conductors with a corresponding plurality of integrally held contactors, which comprises:
    a frame,
    an assembly slideably mounted on the frame, which includes:
        means for supporting the plurality of integrally held, spaced contactors,
        means secured to contactor-supporting means for supporting the corresponding plurality of conductors in an assembled relation with the contactors,
        a housing,
        parallel, spaced slots extending through the housing for receiving and guiding solder strands therethrough,
        a roller mounted for rotation within the housing, the roller being in common engagement with the solder strands,
        means for locking the roller in a nonrotating position for holding the strands in a commonly aligned position adjacent and spaced from the contactor-supporting means, and
        biasing means for normally maintaining the contactor-supporting means and the housing in a spaced relation,
    means spaced from the contactors for heating the contactors, and
    means for moving the assembly toward the heating means with the supported contactors being heated thereby and for moving the housing against the action of the biasing means toward the contactor-supporting means with the aligned, solder ends being deposited onto the heated, assembled contactors and conductors so that the deposited solder melts and where, upon cooling, the conductors are secured with the respective contactors.

7. Apparatus for soldering a plurality of conductors with a corresponding plurality of integrally held contactors, which comprises:
    a frame,
    an assembly slideably mounted on the frame, which includes:
        means for supporting the plurality of integrally held, spaced contactors,
        means secured to contactor-supporting means for supporting the corresponding plurality of conductors in an assembled relation with the contactors,
        a housing,
        parallel, spaced slots extending through the housing for receiving and guiding solder strands therethrough,
        means within the housing in engagement with the intermediate portions of the solder strands for holding the strands in a commonly aligned position adjacent and spaced from the contactor-supporting means,
        a feed roller mounted in the housing and in common engagement with the solder strands,
        a camming arm drivingly attached to the roller for rotating the roller upon movement of the arm, and
        biasing means for normally maintaining the contactor-supporting means and the housing in a spaced relation,
    means spaced from the contactors for heating the contactors,
    means for moving the assembly toward the heating means with the supported contactors being heated thereby and for moving the housing against the action of the biasing means toward the contactor-supporting means with the aligned, solder ends being deposited onto the heated, assembled contactors and conductors so that the deposited solder melts and where, upon cooling, the conductors are secured with the respective contactors,
    a cam projection mounted on the frame in the path of movement of the camming arm, and
    means for moving the assembly away from the heating means whereupon the camming arm engages the cam projection so that the arm is pivoted and the feed roller rotates to advance the solder strands.

8. Apparatus for soldering a plurality of conductors with a corresponding plurality of integrally held contactors, which comprises:
    a frame,
    a pair of spaced rods supported on the frame,
    an assembly slideably mounted on the spaced rods, which includes:
        a carriage formed with slots for supporting the plurality of integrally held, spaced contactors,
        a fixture secured to the carriage and having nests for supporting the corresponding plurality of conductors in an assembled relation with the contactors,
        a housing formed with spaced slots for receiving therethrough solder strands,
        a pair of sleeves slideably positioned on the rods, the carriage and the housing supported on the rods for slideable movement therewith and the housing supported for slideable movement relative thereto,
        a pair of compression springs positioned about the sleeves between the carriage and the housing for normally urging apart the carriage and the housing, and
        means mounted in the housing for holding the leading ends of the solder in a common alignment extending from the housing toward the carriage, means spaced from the contactors for heating the contactors, and means for moving the assembly toward the heating means with the carriage-supported contactors being heated thereby and for moving the housing against the action of the compression springs toward the carriage with the solder ends being deposited onto the heated, assembled contactors and conductors so that the solder melts and where, upon cooling, the conductors are secured with the respective contactors.

9. Apparatus for soldering a plurality of conductors with a corresponding plurality of integrally held, spaced contactors, which comprises:

a frame, a carriage slideably supported on the frame, the carriage formed with means for supporting the plurality of integrally held, spaced contactors, a fixture secured to the carriage, the fixture formed with conductor-receiving nests for supporting a corresponding plurality of conductors in assembled relation with the respective contactors, a heated bar adjacent and spaced from the supported contactors, means for moving the carriage toward the heated bar with the contactors engaging the heated bar so that the contactors are heated, a housing slideably supported on the frame adjacent and spaced from the carriage, the housing having slots for receiving the leading ends of solder strands therethrough with the leading ends extending commonly therefrom toward the carriage, means on the housing for holding the solder ends in the commonly extended position, and means for moving the housing toward the carriage and the heated contactors with the extended leading ends of the solder strands being deposited onto the assembled, heated contactors and conductors where, upon cooling, the conductors are secured with the respective contactors.

No references cited.

JOHN F. CAMPBELL, *Primary Examiner.*